United States Patent [19]

Yamamoto

[11] 4,417,282

[45] Nov. 22, 1983

[54] DOCUMENT INFORMATION FILING SYSTEM

[75] Inventor: Kazuhiko Yamamoto, Yokosuka, Japan

[73] Assignee: Tokyo Shibaura Denki Kabushiki Kaisha, Kawasaki, Japan

[21] Appl. No.: 318,192

[22] Filed: Nov. 4, 1981

[30] Foreign Application Priority Data

Nov. 7, 1980 [JP]  Japan .................................. 55-156720

[51] Int. Cl.³ .............................................. H04H 1/22
[52] U.S. Cl. ...................................... 358/296; 360/79; 271/9
[58] Field of Search ............... 358/257, 287, 296, 102; 360/79; 355/40, 98; 271/9

[56] References Cited

U.S. PATENT DOCUMENTS

| | | | |
|---|---|---|---|
| 4,028,733 | 6/1977 | Ulicki | 358/102 |
| 4,317,138 | 2/1982 | Bryan et al. | 358/291 |
| 4,319,282 | 3/1982 | Hartman, Jr. et al. | 358/291 |
| 4,353,097 | 10/1982 | Takeda et al. | 358/257 |

*Primary Examiner*—Tommy P. Chin
*Assistant Examiner*—Edward L. Coles
*Attorney, Agent, or Firm*—Cushman, Darby & Cushman

[57] ABSTRACT

A central processing unit determines the size of a copying sheet to be used from a document size code read out from an index information recording track of a magnetic tape by a video tape recorder of a document information filing system, and produces copying sheet size data. A copying sheet selecting device is driven according to the copying sheet size data to supply a copying sheet of the size corresponding to the copying sheet size data to a copying device. The copying device reproduces document information corresponding to the index information on the selected copying sheet supplied to it.

7 Claims, 9 Drawing Figures

FIG. 3
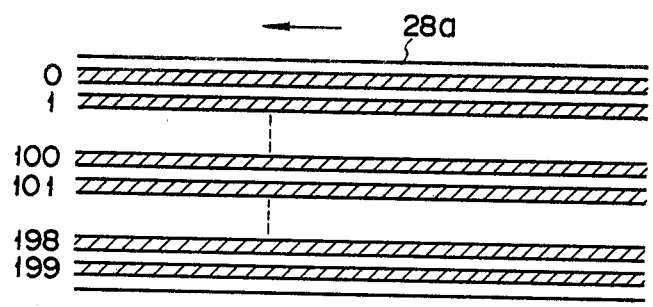
FIG. 4
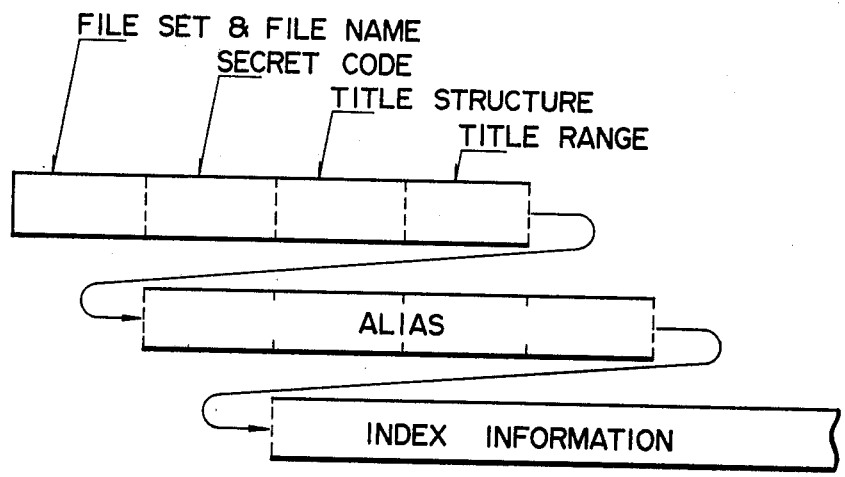
FIG. 5
| TITLE | L | T·ADR | S.ADR | S |
|---|---|---|---|---|
| 20 | 1 | 2 | 1 | 1 |
| 25 | | | | |

DOCUMENT INFORMATION FILING SYSTEM

BACKGROUND OF THE INVENTION

This invention relates to document information filing systems for storing document information in unit information after another in a recording medium and retrieving for and reading out desired document information.

Recently, document information filing systems have been developed and put to practical use. According to such document information filing system, each of a great deal of documents or the like is scanned by a scanner to produce document information which are progressively stored in a storage device. The desired document information among the various document information stored in the storage device is retrieved and read out for being reproduced into a visual state by an output device such as a cathode-ray-tube (CRT) display or a copying device.

In such document information filing system, image information of documents of different sizes are stored. Therefore, the hard copy device uses copying sheets of a plurality of different sizes. However, the size of the copying sheet is appropriately selected by the operator. Since the selection of the copying sheet size is made by the operator's decision, it is sometimes likely that unit document information for one page read out cannot be completely copied on the recording sheet.

SUMMARY OF THE INVENTION

An object of the invention is to provide a document information filing system, which detects the document size for document information read out from a recording medium and selects a proper copying sheet size for the read-out document size for reproduction of document information on the copying sheet of the selected size.

With the document information filing system according to the invention, index information corresponding to the document information to be read out is read out from an index information track of the recording medium, and the size of copying sheet to be used is determined according to the document size data of the read-out index information. A signal representing the determined size is supplied to sheet size selecting means. The sheet selecting means supplies a recording sheet of the size corresponding to the input sheet size signal to the copying device according to the input sheet size signal, and the copying device reproduces document information of proper size on the supplied recording sheet.

BRIEF DESCRIPTION OF THE DRAWINGS

FIG. 3 is a plan view showing a magnetic tape used in the document information filing system;

FIG. 4 is a view showing a format of title information recorded in a title information recording track of the magnetic tape shown in FIG. 3;

FIG. 5 is a view showing a format of title information of index information shown in FIG. 4;

DETAILED DESCRIPTION OF THE PREFERRED EMBODIMENT

Figure 1:
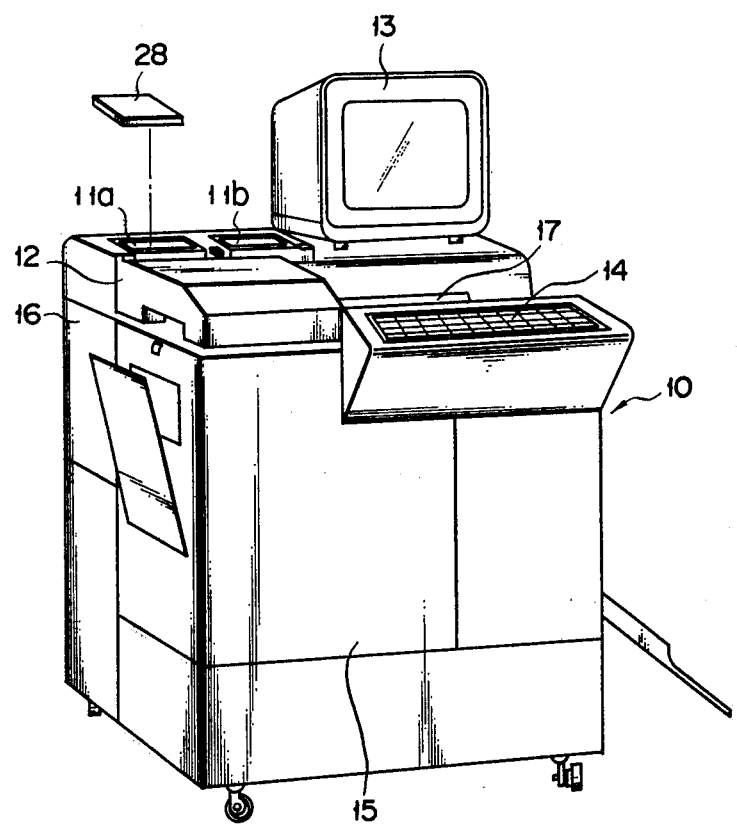
FIG. 1 is a perspective view showing an embodiment of the document information filing system according to the invention.

FIG. 1 shows a document information filing system. On the top of a console 10, a main longitudinal video recorder (LVR) 11a, a back-up VLR 11a, a scanner 12 and a cathode-ray-tube (CRT) display 13, are provided. A keyboard 14 is provided on the front side of the console 10, an electrophotographic copying device 15 is mounted inside the console 10, and a floppy disc device 16 is provided on the rear side of the console 10.

Figure 2:
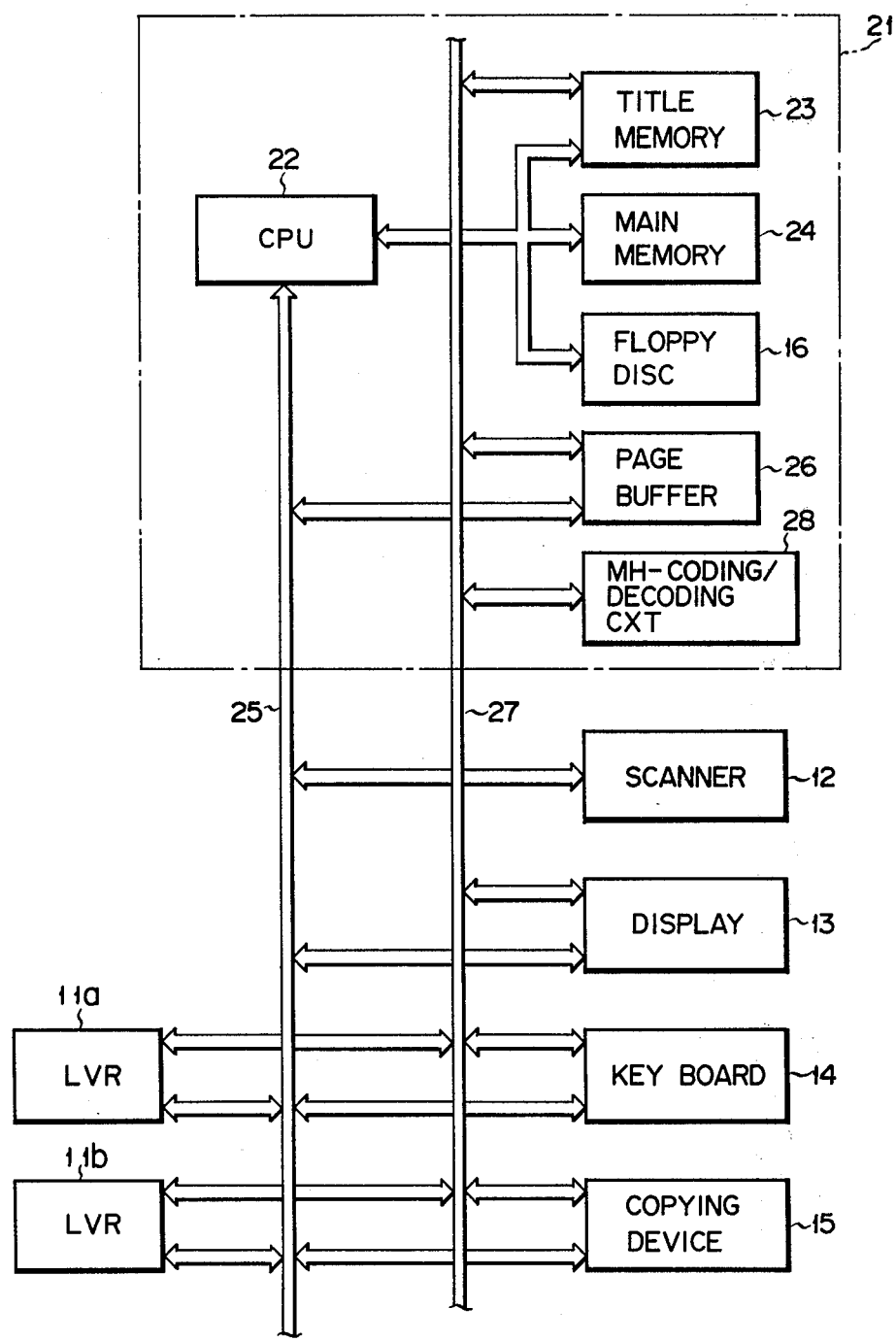
FIG. 2 is a block diagram showing the circuit construction of the document information filing system.

FIG. 2 shows a block diagram of the circuit of the document information filing system. The circuit comprises a control section 21, which includes a central processing unit (CPU) 21 as well as a title memory 23, a main memory 24 and a floppy disc device 16 connected thereto. To the CPU 22 are also connected via a data bus 25 a page buffer 26, a scanner 12, a display 13, a keyboard 14, a copying device 15 and LVRs 11a and 11b. A MH coding and decoding circuit 28 is connected via an image bus 27 to the LVRs 11a and 11b, scanner 12, display 13, keyboard 14 and copying device 15.

FIG. 3 shows a magnetic tape 27a of a magnetic tape cassette 28 which is loaded in the LVR 11a and 11b. The magnetic tape 27a has 200 recording tracks i.e., tracks of track No. 0 to No. 199, formed on it. On these track, the tracks No. 100 and No. 101 are title information recording tracks, with track of track No. 101 used as a back-up track. The remaining tracks, i.e., tracks of track No. 0 to No. 99 and No. 102 to No. 199 are used as document information recording tracks. In the title information recording tracks No. 100 and No. 101 the same title information is recorded in a positionally deviated relation. Thus, if some of title information in the track No. 100 fails to be read out, the identical portion of title information in the backup track (of track No. 101) is read out.

As shown in FIG. 4, the title information consists of management information containing a file set and file name code, a secret code, a title structure code, a title range code and an alias code and various index information. As shown in FIG. 5, each of the various index information contains a title code, which consists of 20 digits divided into 6 items at the most, and an address code for 5 digits. The address code consists of a 1-digit information length L (i.e., number of sectors), a 2-digit track address T.ADR (i.e., track No.), a 1-digit sector address S.ADR and a 1-digit document size S. The document size is represented by, for example, A4, B4 and etc.

The individual items of the title information format shown in FIG. 4 are as follows:

File set name: a name given to a set of files of the same kind.

File name: a name given to file, i.e., a plurality of document information recorded on the magnetic tape of one magnetic tape cassette.

Secret code: a code provided for the secret purpose, consisting of a searcher's secret code permitting only an operator with a permission to retrieve or a qualified person to retrieve and a filer's secret code permitting only the filer to make processing of the file content such as storage, change and deletion.

Title structure: title items that can be set for one unit document information and corresponds to retrieval keys.

Title range: a code representing the range of document information recorded in a single file cassette.

Alias: a code that represents the meaning of a number of digits with a fewer number of digits such as a contracted telephone dial.

Figure 6A:
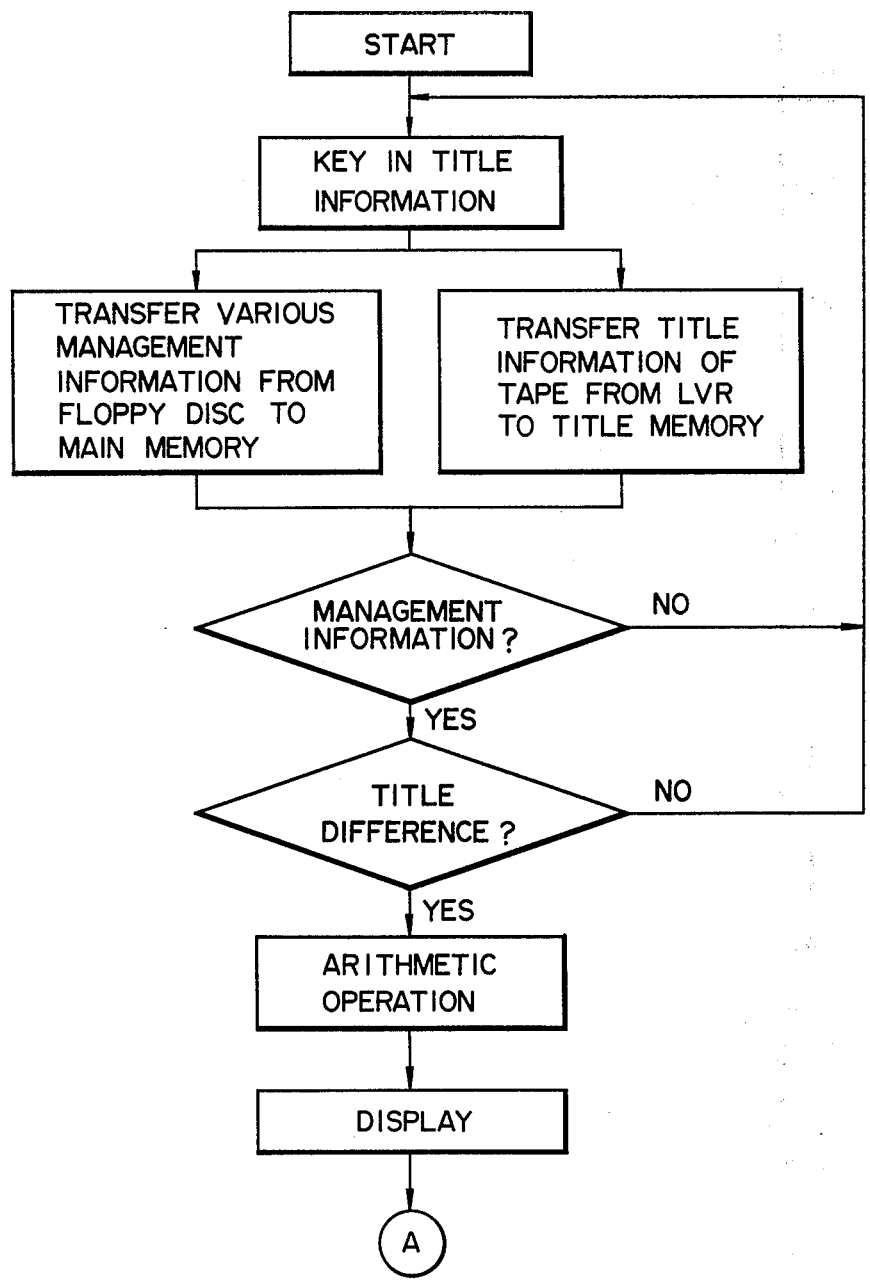
FIGS. 6A and 6B are flow charts for explaining the operation of the document information filing system shown in FIG. 2.
Figure 6B:
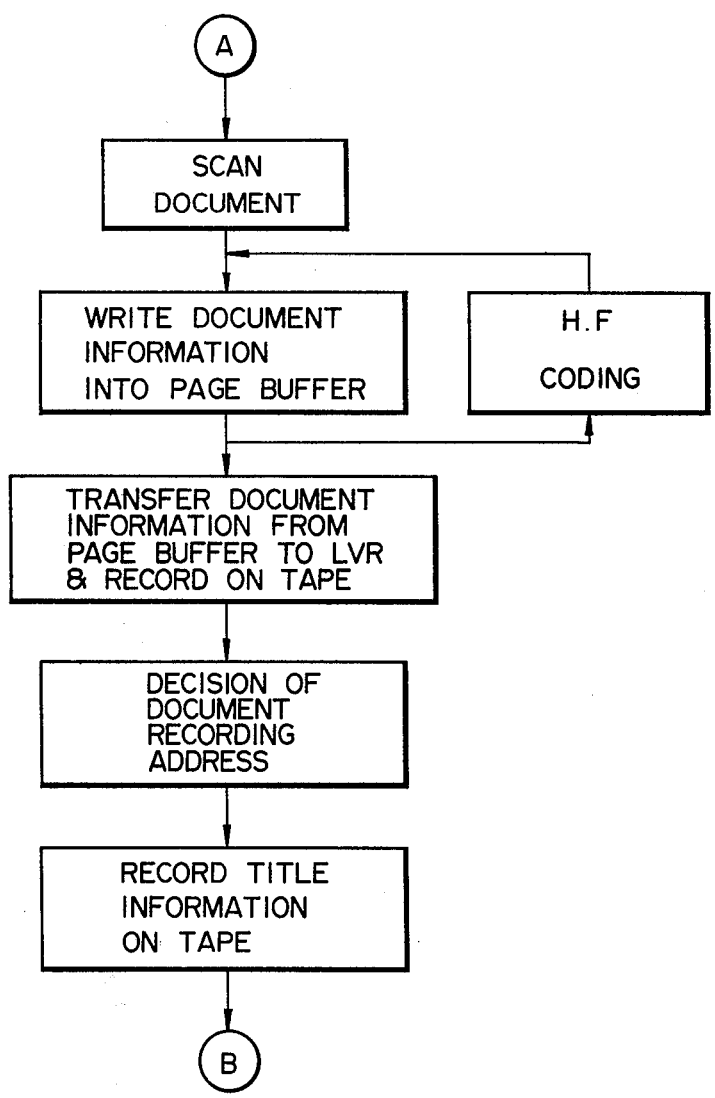
Figure 7:
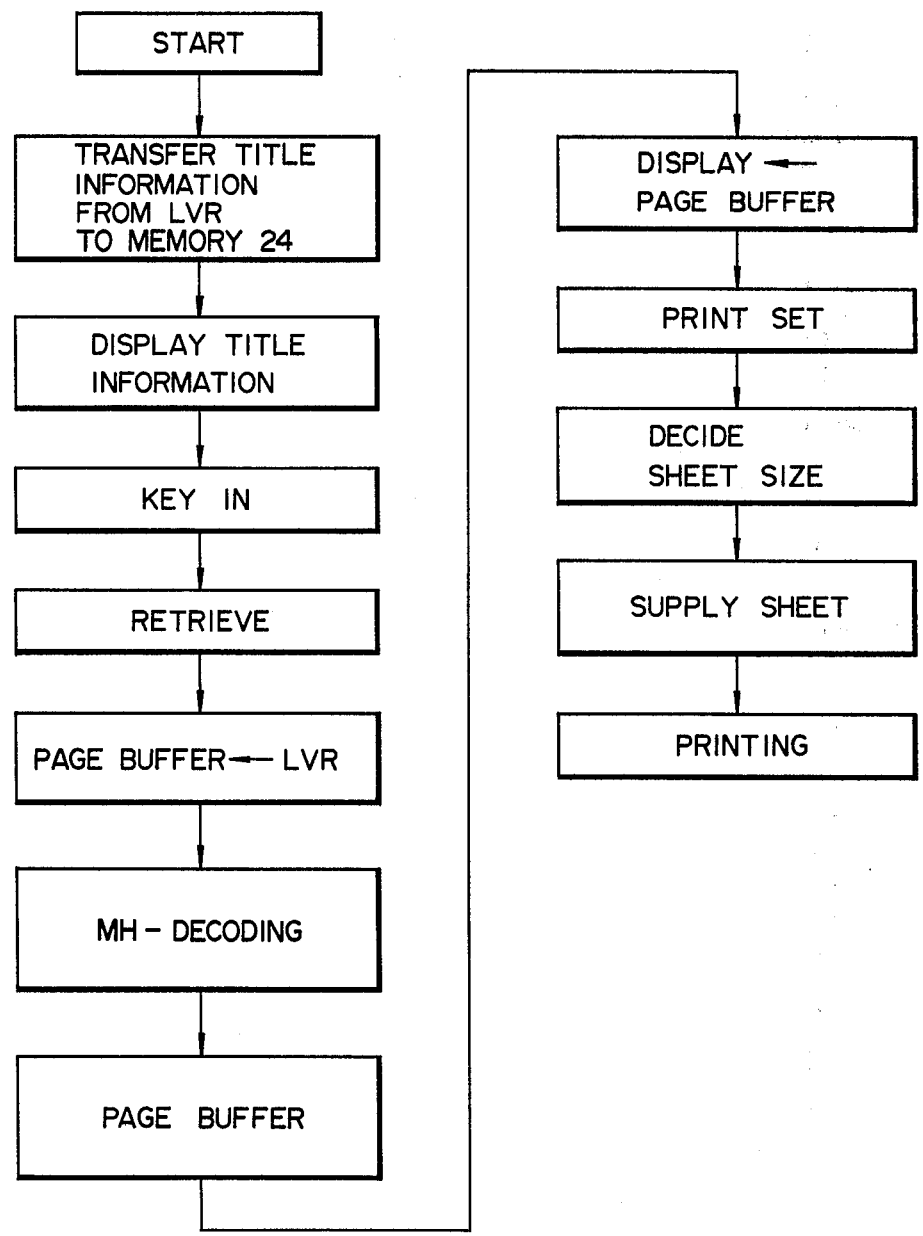
FIG. 7 is a flow chart of a print mode.

Now, the operation of the document information filing system according to the invention will be described with reference to the flow charts of FIGS. 6A and 6B. When a document set in a scanner 12 and a magnetic tape cassette 28 is loaded in the main LVR 11a, the CPU 22 gives a reproduce instruction to the LVR 11a. According to this reproduce instruction, the LVR 11a reproduces title information from the title information track (track No. 100) of the magnetic tape 28a. The reproduced title information is transferred through the image bus to the title memory 23 and written therein. At this time, various management information stored in the floppy disc in the floppy disc device 16 is transferred therefrom to the main memory 24 and stored therein. When the title and size of a document is keyed in by the keyboard 14, these data are written in the main memory 24. The CPU 22 then executes a decision as to whether the management information of the title information in the title memory 23 corresponds to the management information of the main memory 24. If this decision yields a negation, the CPU 22 decides that the document information to be recorded is not suited to the document information filing system and inhibits its recording. In this case, the operation mode is returned to the keying-in step. If the decision mentioned above is unsatisfied, the CPU 22 then executes a decision as to whether the title keyed in and stored in the main memory 24 differs from the title in title information in the title memory 23. If this decision is satisfied, the CPU 22 causes the recording of the document information. If the decision is unsatisfied, the CPU inhibits the recording of the document information. When the decision is satisfied, the CPU 22 calculates the remaining storage capacity of the magnetic tape 28a, i.e., the quantity of document information that can be recorded on the magnetic tape 28a being used. In the calculation of the remaining storage capacity, the CPU 22 calculates the total quantity of document information recorded on the tape 28a, i.e., the number U of recorded sectors from the track and sector numbers of address section of index information in the title information stored in the title memory 23. From this number U of the recorded sectors, the rated storage capacity (256 sectors × 198 tracks) of the magnetic tape, the present non-compressed document information quantity Dmax (sector number of 91) of one unit document information and the average compressed document information quantity Dtyp (sector number of 14 for A4 size document) of one unit information recorded on the magnetic tape, the CPU 22 calculating the remaining storage capacity R (in the form of the number of A4 size documents) using an equation $$R = (T - U - Dmax)/Dtyp$$

The calculated remaining storage capacity (i.e., the number of unit document that can be recorded on the tape being used) and the document size "A4" are displayed on the display 13. If the result R of calculation includes a decimal fraction, the fraction is raised to a unit. The quantity of Dmax is a value which is set by taking into considerations that the unit document information that is actually recorded on the magnetic tape 28a is liable to be greater than the quantity Dtyp.

The operator may determine from the remaining storage capacity R displayed on the display 13 that the documents to be recorded can be reproduced. If it is determined that these document can be recorded, a record start instruction is fed from the keyboard 14 to the CPU 22. The CPU 22 then transmits a document information recording start instruction to the scanner 12 and LVR 11a. As a result, the scanner 12 scans document and generates document information corresponding to the document pattern. The document information produced from the scanner 12 is written into the page buffer 26. The document information stored into the page buffer 26 is subjected to a compression treatment in the MH coding and decoding circuit 28. The compressed document information is written again in the page buffer 26. When document information for one page is stored in the page buffer 26, it is transferred therefrom to the LVR 11a. In the LVR 11a, the compressed document information is recorded in recording tracks following the tracks where document information is already recorded on the magnetic tape 28a. When the document information for one page is completely recorded in recording tracks, the CPU 22 determines the recording position, i.e., address, of the document information recorded on the magnetic tape 28a from the track No. and sector No. of the recorded document information, and produces index information from this address and also from the keyed-in title and document size stored in the main memory 24. The index information is added to the various index information of the title information. When document information of a given number of documents has been recorded on the tape, the various index information that is renewed in the title memory 23 is recorded together with the management information in the title information recording tracks (track No. 100 and No. 101) of the magnetic tape 28a.

Figure 8:
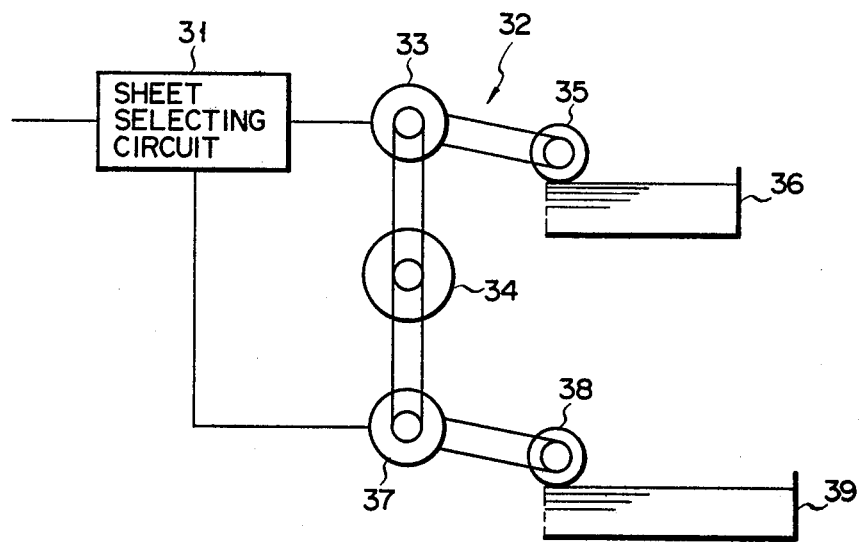
FIG. 8 is a schematic diagram showing a sheet size selecting device.

Now, the operation that takes place when retrieving for an reading out desired document information among the document information stored in the magnetic tape will be described. In this case, the relevant magnetic tape cassette is loaded in the LVR 11a, and a "retrieval mode" is set by the keyboard. At this time, the LVR 11a reads out the title information as shown in FIG. 4 from the title information recording track (of track No. 100 or 101) of the magnetic tape 28a and transmits it to the title memory 23 for storage therein. When the title information is entirely stored in the title memory 23, the various index information of the title memory 23 is displayed on the display 13. The operator searches for the index information corresponding to a desired document among the various index information displayed. When the desired index information is found and the sequence number therein is keyed in from the keyboard 14, the index information corresponding to the sequence number is selected, and the LVR 11a is caused to read out index information from the magnetic tape according to the address of the selected index information. The read-out information for one page is stored in the page buffer 26. Thus, the document information in the page buffer 26 is read out therefrom and transferred to the MH coding and decoding circuit 28. In the MH coding and decoding circuit 28, the input compressed document information is subjected to MH-decoding to obtain the decoded document information which is transferred to the page buffer 26 for storage therein again. When the MH-decoding of document information for one page is ended so that decoded document information for one page is stored in the page buffer 26, the document information in the page buffer 26 is displayed on the display 13. The operator may confirm that the document information displayed on the display 13 is the desired document information. When a print operation key is operated to obtain a hard copy after the confirmation of the document information, a copying operation of the filing system is caused. At this time, the CPU 22 determines the copying sheet size according to the size of the index information for the document information to be reproduced. If this size is A4, for instance, the CPU 22 supplies an A4 sheet selecting command to a sheet selecting circuit 31 in the copying device 15 as shown in FIG. 8. The sheet selecting circuit 31 supplies a clutch signal to a clutch 32 in an A4 sheet supplying device 32 in response to the A4 sheet selecting command. The clutch 33 transmits the rotational force of a motor 34 to the sheet supplying roller 35 to let an A4 size sheet be fed out from the A4 sheet cassette 36 into a photoconductive drum (not shown) in the copying device 15. The copying device 51 reproduces document information on the supplied A4 size sheet. If the size code of the index information for the document information to be reproduced is B4, the CPU 22 supplies a B4 sheet selecting command to the sheet selecting circuit 31 to cause a clutch 37 to be operated for causing a B4 size sheet to be supplied from a B4 sheet cassette 39 by a supplying roller 38. Since the copying sheet size of the size code of index information for the document information to be reproduced is determined in the above way to automatically select the sheet of the determined sheet size, the document information recorded on the magnetic tape can be reproduced without fail on a copying sheet of a proper size, and the possibility of miscopying can be eliminated.

What is claimed is:

1. A document information filing system comprising:
   means for reading out index information from a recording medium having a plurality of first tracks in which to record various document information and at least one second track in which to record said information at least including an address representing the recording position of document information and a size code representing the size of a document;
   sheet size decision means for determining a size of copying sheet depending upon the size code of the index information read out from said reading means and producing sheet size data;
   means for selecting a copying sheet of a sheet size corresponding to the sheet size data from said sheet size decision means; and
   copying device for reproducing document information on the sheet selected by said sheet selection means.

2. The document information filing system according to claim 1, wherein said reading means is a video recorder for recording and reproducing document information and index information on and out of the recording medium.

3. The document information filing system according to claim 1, wherein said copying device is an electrophotographic copying device for reproducing document information read out from the recording medium as a hard copy.

4. A document information filing system comprising;
   a scanner for providing document information by scanning a document;
   recording and reproducing means for recording the document information obtained from said scanner together with index information including at least a size code representing a size of document corresponding to the document information and an address representing a recording position of the document information on a recording medium at the time of recording and reproducing the index information and document information at the time of reproduction;
   sheet size decision means for determining a size of copying sheet according to the size code of the reproduced index information and providing sheet size data;
   means for selecting a copying sheet of a size corresponding to the sheet size data from said sheet size decision means; and
   a copying device for reproducing the document information on the copying sheet selected by said sheet selection means.

5. The document information filing system according to claim 4, wherein said recording and reproducing means is a video tape recorder.

6. The document information filing system according to claim 3 or 4, wherein said copying sheet selection means includes a plurality of sheet feeding means for feeding out sheets of respectively different sizes, and means for selecting one of said sheet supply means according to said sheet size data and causing sheet supply from the selected sheet feeding means.

7. The document information filing system according to claim 3 or 4, which further comprises display means for displaying said document information.

* * * * *